(12) United States Patent
Greene et al.

(10) Patent No.: US 9,533,267 B2
(45) Date of Patent: Jan. 3, 2017

(54) MULTI-STAGE AERATION APPARATUS

(71) Applicant: Seair Inc., Spruce Grove (CA)

(72) Inventors: Kyle Greene, Carmangay (CA); Todd Webb, Mundare (CA)

(73) Assignee: Seair Inc., Spruce Grove (CA)

( * ) Notice: Subject to any disclaimer, the term of this patent is extended or adjusted under 35 U.S.C. 154(b) by 0 days.

(21) Appl. No.: 14/375,211

(22) PCT Filed: Jan. 31, 2013

(86) PCT No.: PCT/CA2013/050077
§ 371 (c)(1),
(2) Date: Jul. 29, 2014

(87) PCT Pub. No.: WO2013/113123
PCT Pub. Date: Aug. 8, 2013

(65) Prior Publication Data
US 2014/0367345 A1    Dec. 18, 2014

Related U.S. Application Data

(60) Provisional application No. 61/592,689, filed on Jan. 31, 2012.

(51) Int. Cl.
*B01F 3/04* (2006.01)
*B01F 5/04* (2006.01)
(Continued)

(52) U.S. Cl.
CPC ......... *B01F 5/0403* (2013.01); *B01F 3/04439* (2013.01); *B01F 3/04496* (2013.01);
(Continued)

(58) Field of Classification Search
CPC .............. B01F 3/04439; B01F 3/04496; B01F 3/04503; B01F 3/04751; B01F 5/0403; B01F 5/0413; B01F 5/0415; B01F 13/1016; B01F 13/1027; B01F 2215/0052; C02F 1/74
(Continued)

(56) References Cited

U.S. PATENT DOCUMENTS

| 159,512 | A | * | 2/1875 | Henderson | ............... F02M 1/00 |
| | | | | | 261/16 |
| 641,684 | A | * | 1/1900 | Ferry | ........................ F28C 1/14 |
| | | | | | 261/110 |

(Continued)

FOREIGN PATENT DOCUMENTS

| CA | 2183146 A1 | 2/1998 |
| DE | 4242425 A1 | 6/1994 |

(Continued)

*Primary Examiner* — Charles Bushey
(74) *Attorney, Agent, or Firm* — Davis & Bujold PLLC; Michael J. Bujold

(57) ABSTRACT

A multi-stage aeration apparatus includes at least two vertically oriented aeration modules. Each aeration module defines a vertically elongated aeration chamber having a top inlet and a bottom outlet. The bottom outlet of each of the aeration modules feeds a fluid stream comprising liquid and gas into the top inlet of an underlying one of the aeration modules. Each aeration module has an aeration head connected to the top inlet, such that the fluid stream passing through the top inlet into the aeration chamber must pass through the aeration head, the aeration head aerating the liquid with the gas in the fluid stream.

16 Claims, 3 Drawing Sheets

(51) Int. Cl.
*B01F 13/10* (2006.01)
*C02F 1/74* (2006.01)

(52) U.S. Cl.
CPC ...... *B01F 3/04503* (2013.01); *B01F 3/04751* (2013.01); *B01F 5/0413* (2013.01); *B01F 5/0415* (2013.01); *B01F 13/1016* (2013.01); *B01F 13/1027* (2013.01); *C02F 1/74* (2013.01); *B01F 2215/0052* (2013.01)

(58) Field of Classification Search
USPC .......................................... 261/76; 210/758
See application file for complete search history.

(56) References Cited

U.S. PATENT DOCUMENTS

| | | | |
|---|---|---|---|
| 780,714 A * | 1/1905 | Ferry | B01F 5/0428 127/12 |
| 801,641 A * | 10/1905 | Boetcher | F04F 5/22 239/428.5 |
| 992,081 A * | 5/1911 | Tait | B01F 5/0428 261/116 |
| 3,482,694 A | 12/1969 | Rice et al. | |
| 3,761,065 A * | 9/1973 | Rich | B01F 3/0473 261/116 |
| 3,892,659 A | 7/1975 | Kirk | |
| 4,145,279 A | 3/1979 | Selby, III | |
| 4,256,574 A | 3/1981 | Bhargava | |
| 4,395,337 A | 7/1983 | Ciepiela | |
| 4,504,388 A | 3/1985 | Desbos et al. | |
| 4,699,740 A | 10/1987 | Bollenrath | |
| 4,911,836 A | 3/1990 | Haggerty et al. | |
| 5,049,320 A | 9/1991 | Wang et al. | |
| 5,091,118 A * | 2/1992 | Burgher | B01F 5/0451 261/123 |
| 5,356,600 A | 10/1994 | Kiyonaga et al. | |
| 5,498,347 A | 3/1996 | Richard | |
| 5,514,267 A | 5/1996 | Machiya et al. | |
| 5,545,330 A | 8/1996 | Ehrlich | |
| 5,587,113 A | 12/1996 | Caballero | |
| 5,711,887 A | 1/1998 | Gastman et al. | |
| 5,711,902 A | 1/1998 | Hsu | |
| 5,843,307 A | 12/1998 | Faivre et al. | |
| 5,900,154 A | 5/1999 | Henriksen | |
| 5,951,922 A | 9/1999 | Mazzei | |
| 6,123,323 A | 9/2000 | Yoneda et al. | |
| 6,132,629 A | 10/2000 | Boley | |
| 6,214,242 B1 * | 4/2001 | Swensen | B01D 19/0015 210/252 |
| 6,464,875 B1 | 10/2002 | Woodruff | |
| 6,569,338 B1 | 5/2003 | Ozyboyd | |
| 6,740,245 B2 | 5/2004 | Johnson | |
| 6,758,462 B2 * | 7/2004 | Bellas | B01F 3/0473 261/115 |
| 6,869,540 B2 | 3/2005 | Robinson et al. | |
| 6,923,901 B2 | 8/2005 | Leffler et al. | |
| 7,137,620 B2 | 11/2006 | Thomas et al. | |
| 7,273,562 B2 | 9/2007 | Robinson et al. | |
| 7,381,338 B2 | 6/2008 | van Leeuwen et al. | |
| 7,402,253 B2 | 7/2008 | van Leeuwen et al. | |
| 7,419,143 B2 * | 9/2008 | Lee | B01F 3/04049 261/115 |
| 8,038,127 B2 * | 10/2011 | Matsuoka | B01F 3/0446 210/150 |
| 2002/0117458 A1 | 8/2002 | Puetter et al. | |
| 2004/0099607 A1 | 5/2004 | Leffler et al. | |
| 2006/0073080 A1 | 4/2006 | Tonkovich et al. | |
| 2007/0102359 A1 | 5/2007 | Lombardi et al. | |
| 2007/0257385 A1 | 11/2007 | Nagasaka et al. | |
| 2008/0112257 A1 | 5/2008 | Masuda | |
| 2008/0314807 A1 | 12/2008 | Junghanns et al. | |
| 2010/0108615 A1 | 5/2010 | Christophersen et al. | |
| 2010/0219260 A1 | 9/2010 | Matsuoka et al. | |
| 2010/0258427 A1 | 10/2010 | Towler | |
| 2011/0156287 A1 | 6/2011 | Tsai | |

FOREIGN PATENT DOCUMENTS

| | | |
|---|---|---|
| EP | 0238774 A2 | 9/1987 |
| EP | 0673885 A2 | 9/1995 |
| EP | 0827765 A2 | 3/1998 |
| EP | 0827940 A1 | 3/1998 |
| EP | 0854295 A1 | 7/1998 |
| GB | 671365 A | 5/1952 |
| JP | 7060088 | 3/1995 |
| JP | 2000189981 A | 7/2000 |
| KR | 200344145 | 3/2004 |
| KR | 20060104476 A | 10/2006 |
| RU | 2282595 C1 | 8/2006 |
| SU | 997398 A1 | 11/1982 |
| SU | 1699959 A1 | 12/1991 |
| WO | 9620041 A1 | 7/1996 |
| WO | 03022413 A1 | 3/2003 |
| WO | 03061814 A1 | 7/2003 |
| WO | 2005049502 A1 | 6/2005 |
| WO | 2005061388 A1 | 7/2005 |
| WO | 2007053110 A1 | 5/2007 |
| WO | 2008113150 A1 | 9/2008 |
| WO | 2009127870 A2 | 10/2009 |
| WO | 2011073977 A1 | 6/2011 |
| WO | 2011075824 A1 | 6/2011 |

* cited by examiner

MULTI-STAGE AERATION APPARATUS

FIELD

This relates to an aeration apparatus which has a series of gas injection and reaction zones.

BACKGROUND

Aeration systems are used in many different applications, including wastewater treatment. The use of aeration towers in series is inefficient and takes up space, it is also difficult to balance backpressure within the system. If a single tower is used and fluid is recirculated through the tank, treated fluid with microbubbles passing through the injector and pump are degraded and larger bubbles are formed. This reduces the efficiency of the system.

SUMMARY

There is provided a multi-stage aeration apparatus, comprising at least two vertically oriented aeration modules, each aeration module defining a vertically elongated aeration chamber having a top inlet and a bottom outlet, the bottom outlet of each of the aeration modules feeding a fluid stream of liquid and gas into the top inlet of an underlying one of the aeration modules. Each aeration module has an aeration head connected to the top inlet such that the fluid stream passing through the top inlet into the aeration chamber must pass through the aeration head, the aeration head aerating the liquid with the gas in the fluid stream.

According to an aspect, the aeration head may depend into the aeration chamber. The aeration head may be a vertically depending pipe with a closed lower end and radial openings through which the fluid stream exits the aeration head.

According to an aspect, gas may be supplied to of a first aeration module by a venturi injector to create the fluid stream.

According to an aspect, the gas in the fluid stream may be at least partially dissolved or entrained by the liquid.

According to an aspect, the multi-stage aeration apparatus may further comprise supplemental gas inlets in one or more aeration modules.

According to an aspect, the multi-stage aeration apparatus may further comprising an exit valve for controlling back pressure in the aeration modules.

According to a further aspect, there is provided a method of aerating a liquid, comprising the steps of providing an apparatus comprising at least two vertically oriented aeration modules, each aeration module defining a vertically elongated aeration chamber having a top inlet and a bottom outlet, the bottom outlet and the top inlet of adjacent aeration modules being directly connected, wherein each aeration module has an aeration head connected to the top inlet; and injecting a fluid stream comprising a liquid to be aerated and a gas into the apparatus, the fluid stream passing through the aeration heads of the at least two aeration modules such that the liquid is aerated by the gas.

According to an aspect, the method may further comprise the step of injecting a supplemental gas into at least one aeration module to supplement the gas in the fluid stream. The supplemental gas may be different from the gas in the fluid stream.

According to an aspect, the aeration head may depend into the aeration chamber. The aeration head may be a vertically depending pipe with a closed lower end and radial openings through which the fluid stream exits the aeration head.

According to an aspect injecting a fluid stream may comprise using a venturi injector.

According to an aspect, the gas in the fluid stream may be at least partially dissolved or entrained by the liquid.

According to an aspect, the method may further comprise the step of adjusting the back pressure in the apparatus by controlling an exit valve connected to the bottom outlet of the last aeration module.

With the multi-stage aeration apparatus, as described above, liquid passes downwardly through the aeration modules until a desired gas saturation is achieved. As many aeration modules are used as may be required to achieve the desired gas saturation. If there is excess gas, it is carried with the liquid from one module to the next.

There are a variety of configurations of aeration head that could be used. There will hereinafter be described an aeration head in the form of a vertically depending pipe with an end cap at a lower remote end and radial openings through which liquid exits the aeration head.

There are a variety of ways of feeding aeration gas into the aeration head. There will hereinafter be described gas supplied to the aeration head by a venturi injector, which draws gas into liquids passing through the aeration head.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
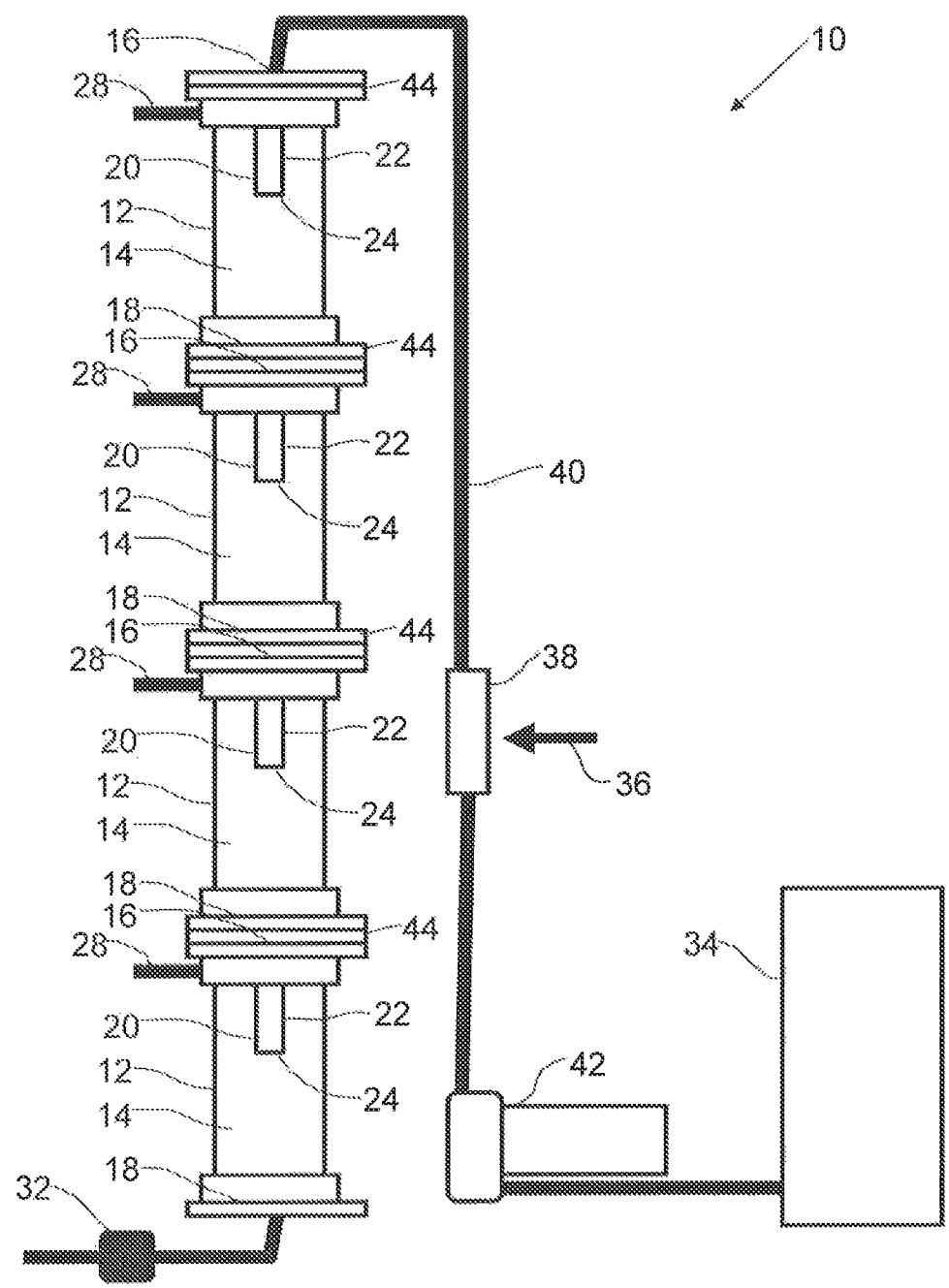
FIG. 1 is a side elevation view of an aeration tower made from a plurality of aeration modules.
Figure 2:
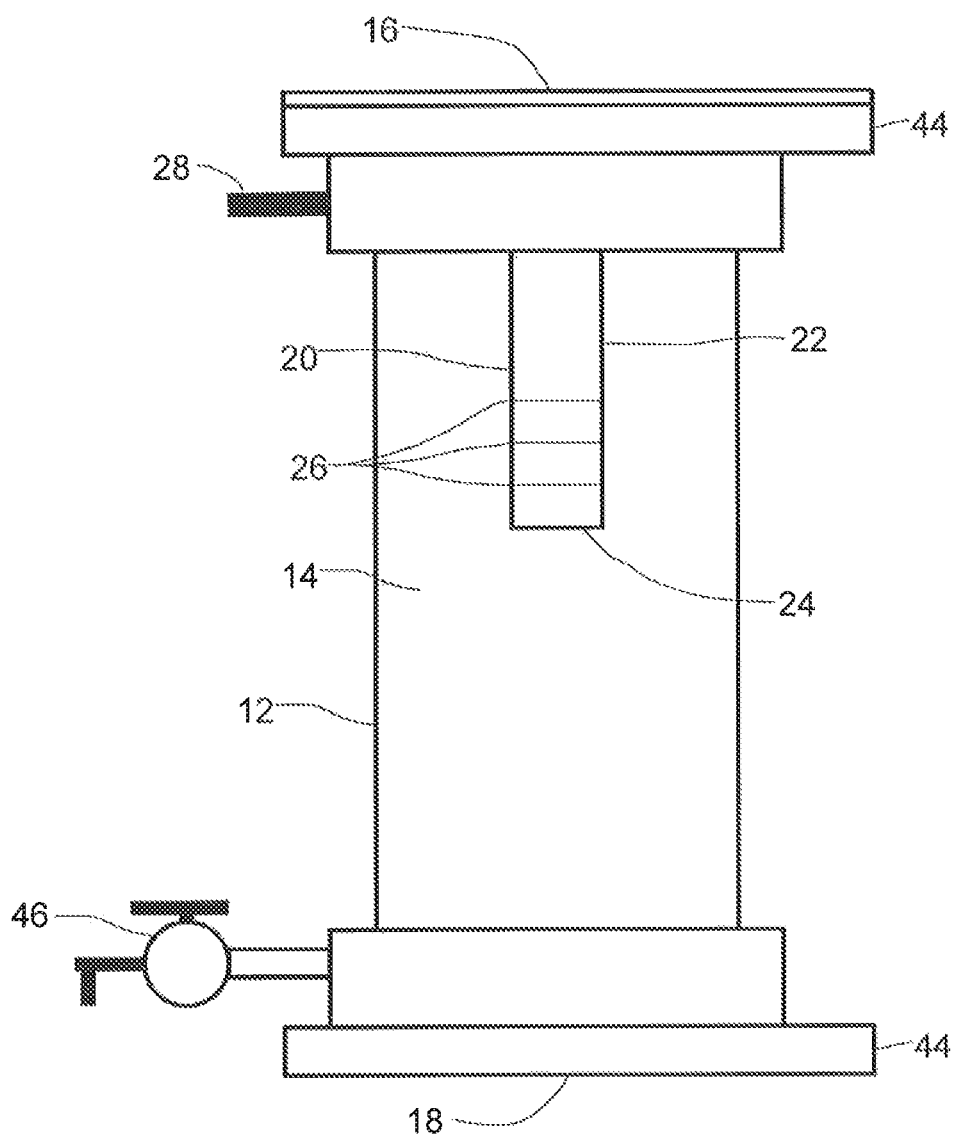
FIG. 2 is a side elevation view of one of the aeration modules from the aeration tower of FIG. 1.
Figure 3:
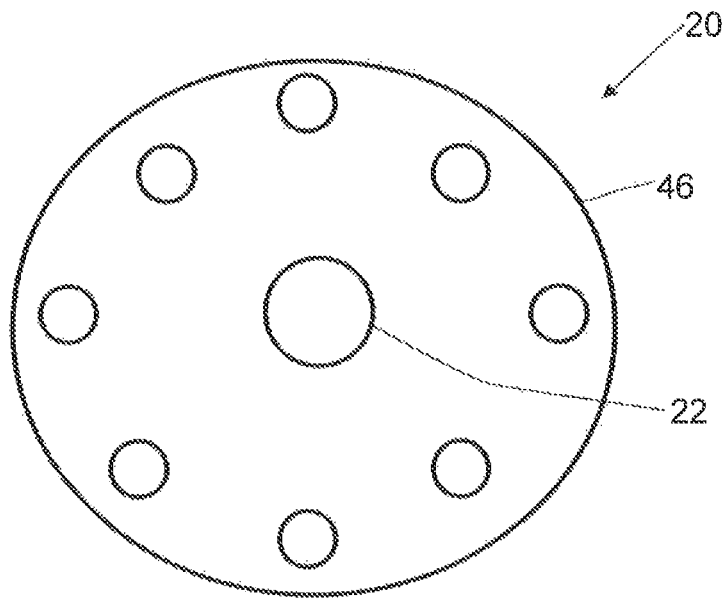
FIG. 3 is a bottom plan view of an aeration head from the aeration modules of FIG. 2.
Figure 4:
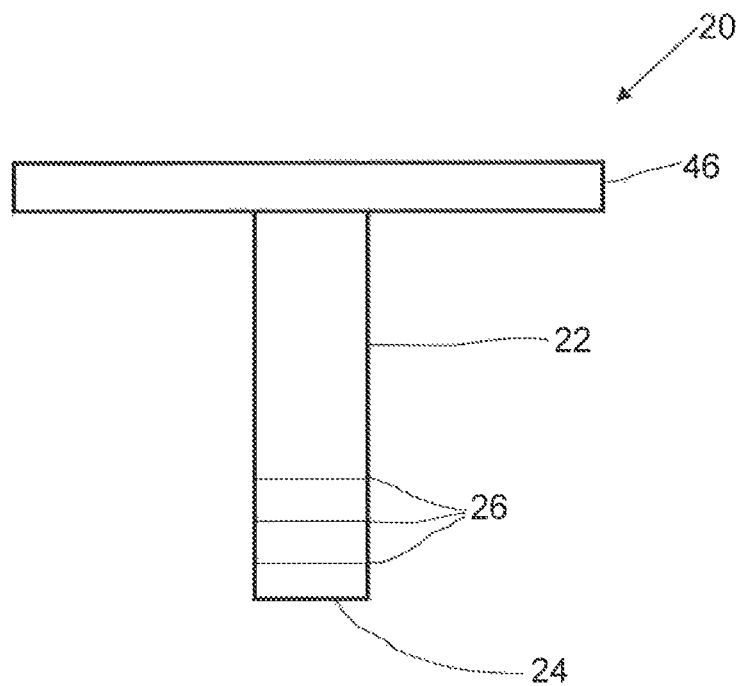
FIG. 4 is a side elevation view of the aeration tower of FIG. 1.

A multi-stage aeration apparatus generally identified by reference numeral 10, will now be described with reference to FIG. 1 through 4.
Structure and Relationship of Parts:

Referring to FIGS. 1 and 2, multi-stage aeration apparatus 10 includes at least two vertically oriented aeration modules 12. Each aeration module 12 defines a vertically elongated aeration chamber 14 having a top inlet 16 and a bottom outlet 18. Bottom outlet 18 of each of the aeration modules 12 feeds liquid into top inlet 16 of an underlying one of the aeration modules. The first aeration module 12 receives a gas/liquid mixture from a gas and liquid source. The gas may be injected using, for example, a pressurized source of as or a venturi. As shown, there is a source of liquid 34 and a source of gas 36 mixed using a venturi 38. The liquid is driven through venturi 38 and fluid line 40 using a pump 42. The liquid and gas stream may be referred to as a fluid stream. As the fluid stream passes through apparatus 10, some or all of the gas, and any supplemental gas as will be discussed below, is entrained or dissolved into the liquid. When the term "fluid stream" is used herein, it is intended to refer to the liquid to be aerated, and the gas that has been used or is intended to aerate the liquid. Each aeration module 12 has an aeration head 20 connected to top inlet 16, such that all fluids passing through the top inlet 16 into the aeration chamber 14 must pass through aeration head 20. As the fluid stream passes through aeration head 20, some gas is formed into microbubbles that are entrained by the liquid, and some gas is dissolved into the liquid. An example of an aeration head 20 is shown in FIGS. 3 and 4, where there is a vertically depending pipe 22 with a closed lower end 24 that extends into the aeration chamber 14. Pipe 22 has radial openings 26, or slots as shown, through which liquid exits aeration head 20. Radial openings 26 are preferably angled toward a common point a certain distance out from pipe 22 such that the respective streams impinge upon each other to increase the shearing forces that cause the microbubbles to thrill. For example, with the example of three slots 26 shown the top slot may be angled down at about 30 degrees, the middle slot may be horizontal, and the bottom slot may be angled up at about 30 degrees such that the streams impinge upon each other. Other designs of aeration heads 20 may also be used.

Referring again to FIGS. 1 and 2, there may be supplemental gas inlets 28 into one or more chambers 14 as shown. These may be used to introduce a supplemental gas, or a different type of gas. Preferably, the gases injected at these points will be only slightly higher than the pressure in the system to avoid creating an imbalance in the system. In one example, when treating production water from an oil well, there may be 20 to 30 modules 12. Air or oxygen is introduced into the first set of modules 12 to treat contaminants that are relatively easier to oxidize such as iron, BTEX (benzene, toluene, ethylbenzen and xylenes), etc. Ozone may then be introduced in later modules 12 to treat remaining contaminants that are more difficult to oxidize, such as heavy metals, remaining hydrocarbons, etc. Carbon dioxide may be introduced to adjust the pH of the fluid stream, and nitrogen or other inert gases may be injected at the end to flush out or displace any remaining gases that may be entrained in the liquid such that it may be safely disposed of. The number of modules and the types of gases and the order and volume in which they are injected will depend on the type of liquid being treated and the desired composition of the end result.

As shown in FIGS. 1 and 2, modules 12 are attached to each other using flanges 44. Other types of attachments may also be used as will be recognized. Modules 12 may be attached in such a manner that they are held vertically aligned and sealed together such that the fluid stream passes entirely from one module 12 to the next. Referring to FIGS. 3 and 4, aeration head 20 may also have a flange 46 that is attached between flanges 44. Other designs to mount aeration head 20 within modules 12 may also be used. Modules 12 may also have a test port 46 for removing a sample from modules for testing purposes.

In prior art aeration towers that are placed in series, venturi injectors cannot be included in series and only the aeration provided by the aeration heads may be used. This makes series of towers inefficient and back pressure difficult to balance. In order to correct for this, apparatus 10 has a single pass design with aeration modules 12 that can be added sequentially with little additional space requirements. Referring to FIG. 1, fluid flow occurs in a top down approach. Aeration heads 20 are positioned at the inlet of the aeration modules 12 and provide an efficient transfer of gas and liquid to each aeration chamber 14. Additional gas may be added to an aeration chamber 14, such as at the first end of each aeration module 12, by way of supplemental gas inlets 28.

Referring to FIG. 1, aeration chambers 14 of aeration modules 12 are in sequential sections of apparatus 10. Back pressure is balanced using a valve 32 connected at the outlet 18 of the final aeration module 12 to ensure the most efficient gas transfer into the liquid to be aerated. The amount of back pressure is balanced between creating a more stable aerated liquid and reducing the aeration potential of the system. Preferably, aeration chambers include gas, and sufficient gas that a mixture of liquid gas passes through the next aeration module 12. In other words, aeration chambers 14 are preferably filled primarily with gas, such that both gas and liquids flow out through the attached aeration head 20 into the next module. This allows other gases to be introduced into the stream by injecting the gas into a chamber 14 above an aeration head 20 and permitting both the gas and the liquid to pass through aeration head 20. The amount of gas and liquid passing through each aeration head 20 may be controlled by controlling the back pressure in the system and the pressure of the supplemental gas being injected through supplemental gas inlets 28. However, in order to control the back pressure, the final module 12 is permitted to at least partially fill with liquid, and such that primarily liquid is removed from the system.

Rather than being used to inject more gas into the stream, additional modules 12 may be used to simply stabilize the microbubbles of the liquid mixture and achieve a supersaturated state.

The pressure drop across the system is preferably kept to a minimal level to make the gas transfer more effective. When a single pump is used, the pressure drop in the system must be minimal, therefore minimal elbows and direction changes must be used. While sequential aeration towers have approximately a 3 psi drop across each aeration tower, the single line apparatus 10 described herein preferably has approximately a 1 psi drop across each aeration chamber. In prior art systems, the use of a venturi injector caused a drop in the suction efficiency. The present apparatus may be designed with minimal suction losses with the addition of each additional aeration chamber.

The back pressure in an aeration system must be balanced to accommodate the conditions across each section. There is an effective back pressure to a single aeration tower at a specific flow rate. While the same is true for a multi-stage aeration system, it is not the same as a single unit and cannot be thought of in the same manner. The multistage aeration system allows for high concentrations and strong reaction zones and allows for the elimination of tanks for residence time.

A single aeration tower is efficient enough to dissolve all of the gas that a venturi injector can inject. In order to increase the total gas in the system, other gas injection points may be added. The combination of venturi injection at the beginning followed by gas injection in sequential aeration chambers allows for extremely high gas concentrations, stronger reaction zones and the ability to change gases to cause complex reactions. This removes the necessity for tanks for additional gas injection or secondary gas injection, decreasing footprint and capital costs substantially.

Operation:

With the multi-stage aeration apparatus, as described above, liquid passes downwardly through the aeration modules to achieve a desired gas saturation. As many aeration modules are used as may be required to achieve the desired gas saturation. Excess gas in one module is carried with the liquid from one module to the next.

As the liquid and gas passes through each stage of the multi-stage aeration system, the aeration modules cause a water/gas mixture to be sheared, cutting bubbles into smaller sizes. The increased energy helps reactions to occur. Each time the water/gas mixture exits the aeration head of an aeration chamber, smaller hubbies are created. This allows for a higher gas concentration to be achieved and can continue until there is no free gas remaining. Very strong reaction zones are created when the water/gas mixture exits the aeration heads which increases chemical reaction rates.

Advantages of Present Apparatus:

The multistage diffusion system may provide for several advantages over prior diffusion systems, such as:
- Achieving higher dissolved gas concentrations using the same pumping power and gas volumes
- More gas can be dissolved into solution with increasing rates of reaction
- Different gases can be added into the same flow stream by incorporating different gases at different aeration modules
- Smaller bubble size can be achieved as there is no recirculation
- Sequential reaction zones obviate the need for tanks and multiple cycling though the system
- A decreased footprint of treatment systems by removing the tanks, extra aeration systems and pumps
- Less cost associated with building treatment systems
- UV can be added to the system for advanced oxidation to occur in multiple reaction zones
- Aeration modules can be stacked to form an aeration tower with an increased number of reaction zones without the requirement for additional power input In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set firth in the examples, but should be given the broadest interpretation consistent with the description as a whole.

What is claimed is:

1. A multi-stage aeration apparatus, comprising:
at least three vertically oriented aeration modules comprising a first aeration module that receives a gas and liquid mixture from a gas and liquid source and two or more underlying aeration modules, each aeration module defining a vertically elongated aeration chamber having a top inlet and a bottom outlet, the bottom outlet of each of the aeration modules feeding a fluid stream comprising liquid and gas into the top inlet of an underlying one of the aeration modules, wherein one or more underlying aeration modules comprises a supplemental gas inlet; and
each aeration module having an aeration head connected to the top inlet and positioned in a headspace of the underlying aeration module such that the fluid stream passing through the top inlet into the aeration chamber must pass through the aeration head, the aeration head aerating the liquid with the gas in the fluid stream in the headspace of the underlying aeration module.

2. The multi-stage aeration apparatus of claim 1, wherein the aeration head depends into the aeration chamber.

3. The multi-stage aeration apparatus of claim 2, wherein the aeration head is a vertically depending pipe with a closed lower end and radial openings through which the fluid stream exits the aeration head.

4. The multi-stage aeration apparatus of claim 1, wherein gas is supplied to a first aeration module by a venturi injector to create the fluid stream.

5. The multi-stage aeration apparatus of claim 1, wherein the gas in the fluid stream is at least partially dissolved or entrained by the liquid.

6. The multi-stage aeration apparatus of claim 1, further comprising an exit valve for controlling back pressure in the aeration modules.

7. The multi-stage aeration apparatus of claim 1, wherein the supplemental gas inlet injects supplemental gas into the aeration chamber above the bottom outlet of the one or more aeration modules, and the aeration head of the aeration chamber below the supplemental gas inlet aerates the liquid with the gas in the fluid stream and the supplemental gas.

8. A method of aerating a liquid, comprising the steps of:
providing an apparatus comprising at least two vertically oriented aeration modules comprising a first aeration module that receives a gas and liquid mixture from a gas and liquid source and one or more underlying aeration modules, each aeration module defining a vertically elongated aeration chamber having a top inlet and a bottom outlet, the bottom outlet and the top inlet of adjacent aeration modules being directly connected, wherein each aeration module has an aeration head connected to the top inlet, wherein one or more underlying aeration modules comprises a supplemental gas inlet; and
injecting a fluid stream comprising a liquid to be aerated and a gas into the apparatus, the fluid stream passing through the aeration heads of the at least two aeration modules such that the liquid is aerated by the gas as the liquid enters the headspace of the adjacent aeration module.

9. The method of claim 8, further comprising the step of injecting a supplemental gas through the supplemental gas inlets into at least one aeration module to supplement the gas in the fluid stream.

10. The method of claim 9, wherein the supplemental gas is different from the gas in the fluid stream.

11. The method of claim 8, wherein the aeration head depends into the aeration chamber.

12. The method of claim 11, wherein the aeration head is a vertically depending pipe with a closed lower end and radial openings through which the fluid stream exits the aeration head.

13. The method of claim 8, wherein injecting a fluid stream comprises using a venturi injector.

14. The method of claim 8, wherein the gas in the fluid stream is at least partially dissolved or entrained by the liquid.

15. The method of claim 8, further comprising the step of adjusting the back pressure in the apparatus by controlling an exit valve connected to the bottom outlet of the last aeration module.

16. The method of claim 8, wherein the supplemental gas inlet injects supplemental gas into the aeration chamber above the bottom outlet of the one or more aeration modules, and the aeration head of the aeration chamber below the supplemental gas inlet aerates the liquid with the gas in the fluid stream and the supplemental gas.

* * * * *